United States Patent
Petty

[15] 3,687,414
[45] Aug. 29, 1972

[54] VALVE ASSEMBLY
[72] Inventor: William F. Petty, Cocoa, Fla.
[73] Assignee: Robert G. Robbins, Doctors Inlet, Fla.
[22] Filed: Nov. 9, 1970
[21] Appl. No.: 87,809

[52] U.S. Cl. .................251/77, 251/288, 85/45, 85/9
[51] Int. Cl. ..................................F16k 31/44
[58] Field of Search ...........85/9, 45; 251/77, 288; 137/382, 384

[56] References Cited

UNITED STATES PATENTS

| | | | |
|---|---|---|---|
| 2,994,341 | 8/1961 | Leopold et al. | 137/382 |
| 2,033,371 | 3/1936 | Benaggio | 137/384 X |
| 3,467,356 | 9/1969 | Mueller | 137/384 X |
| 2,093,026 | 9/1937 | Bernhard | 85/45 UX |
| 2,371,121 | 3/1945 | Basquin | 85/32 |

FOREIGN PATENTS OR APPLICATIONS

| | | | |
|---|---|---|---|
| 881,129 | 6/1953 | Germany | 85/45 |
| 131,857 | 9/1919 | Great Britain | 85/45 |

*Primary Examiner*—Henry T. Klinksiek
*Attorney*—George H. Baldwin and Arthur G. Yeager

[57] ABSTRACT

Valve assembly having at one end a valve actuator which is operative to move the valve from one position, such as an open position, into another position, such as a closed position, but which cannot thereafter be used to return the valve to its first or open position due to a lost-motion connection between them. On the opposite end of the valve assembly, a valve actuator is provided which cannot be operated by hand or by a conventional tool but can be operated by a special tool to return or reset the valve from its other position into its one position. The last mentioned valve actuator includes an arrangement for indicating unauthorized resetting of the valve.

3 Claims, 9 Drawing Figures

Patented Aug. 29, 1972
3,687,414
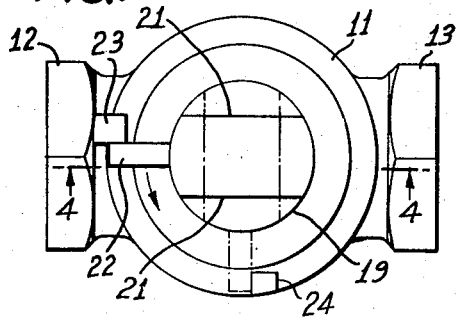
FIG.1
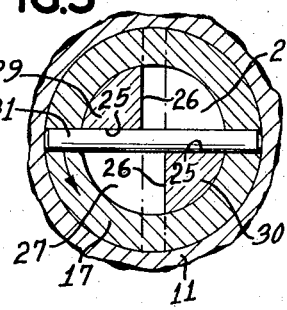
FIG.5
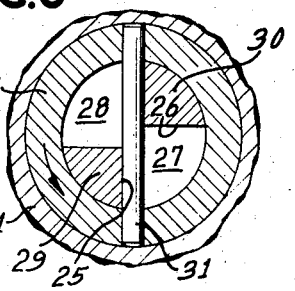
FIG.6
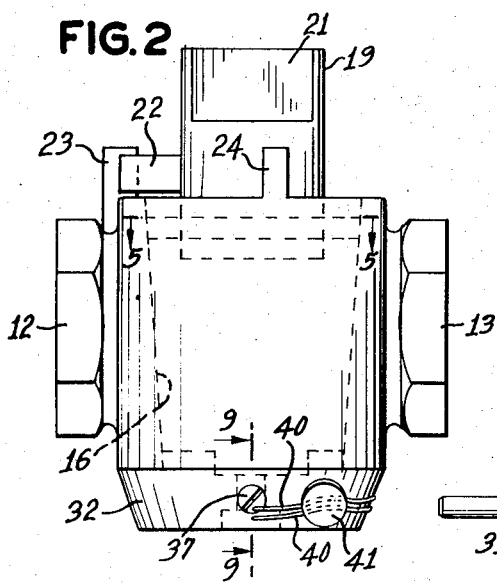
FIG.2
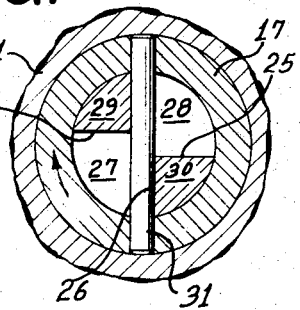
FIG.7
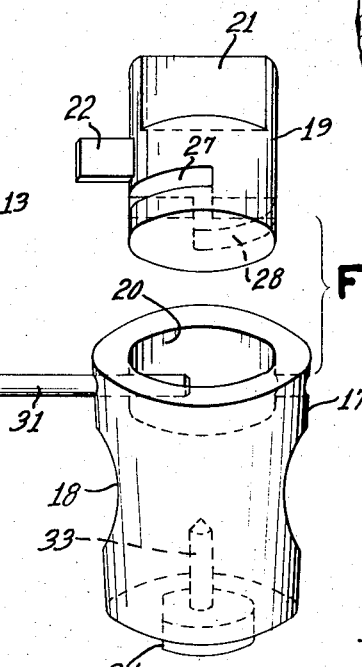
FIG.8
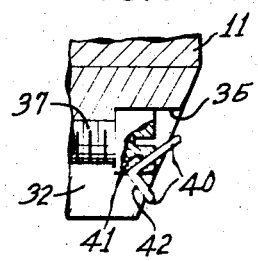
FIG.9
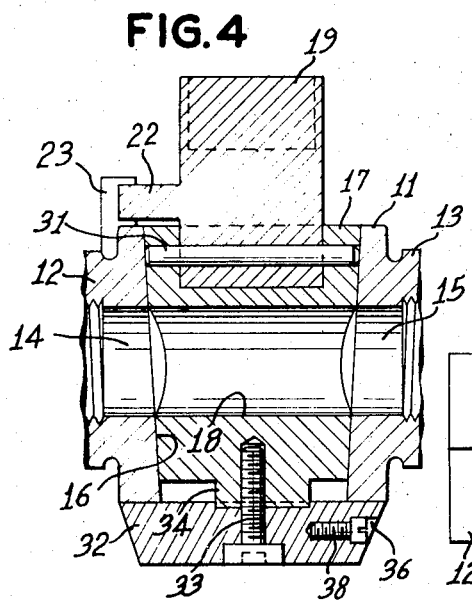
FIG.4
FIG.3
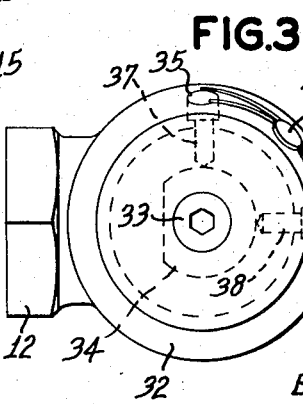
INVENTOR
William F. Petty
BY George H. Baldwin
ATTORNEY

VALVE ASSEMBLY

This invention relates to a valve assembly which enables ready and convenient moving of the valve from one position, such as an open position, to another position but inhibits its being returned to its original position.

The present valve assembly is particularly advantageous for use in the gas or water line in a residence, or in other situations where the valve should be capable of being closed readily by persons not specially trained to service the valve but should be reopened only by trained personnel, so as to avoid the danger of an explosion, for example. In accordance with the present invention, a valve assembly is provided which has these characteristics and which is relatively simple in construction and durable and reliable in operation.

Accordingly, it is a principal object of this invention to provide a novel and improved valve assembly which enables the valve to be moved readily from one to another position but not back again into the one position, and particularly wherein the valve may be closed readily but which inhibits the reopening of the valve.

Another object of this invention is to provide such a valve assembly which has provision for indicating any unauthorized resetting of the valve once it has been moved from one to another position.

While the invention is applicable to use in situations in which the valve will be normally open and in which it is desirable that any person have the ability to close the valve but not thereafter to reset or reopen the valve, it may by a simple reorientation of the parts be adapted for situations in which it is desired that the valve be normally closed, that it be readily opened by an unskilled person but that resetting of the valve into closed position cannot readily be accomplished except by authorized persons provided with a special tool for the purpose.

Further objects and advantages of this invention will be apparent from the following detailed description of a presently-preferred embodiment thereof, which is illustrated in the accompanying drawing.

In the drawing:

FIG. 1 is a top plan view of the present valve assembly, showing the valve-closing actuator in full lines of one limit stop and in phantom lines at its other limit stop;

FIG. 2 is a front elevational view of this valve assembly;

FIG. 3 is a bottom plan view of the valve assembly of FIGS. 1 and 2 and showing the valve re-opening actuator thereat;

FIG. 4 is a vertical longitudinal section through the valve assembly, taken along the line 4—4 in FIG. 1 and showing the valve open;

FIG. 5 is a section taken along the line 5—5 in FIG. 2 and showing the rotational positions of the valve-closing actuator and the plug valve member in the normal, open position of the valve;

FIG. 6 is a view similar to FIG. 5, but showing the rotational position of these parts when this actuator is turned to close the valve;

FIG. 7 is a view similar to FIGS. 5 and 6 showing the parts after the valve-closing actuator has been turned back to its original (FIG. 5) position but with the plug valve member remaining in its valve-closing position;

FIG. 8 is an exploded perspective view of the valve-closing actuator and the rotary plug valve member before assembly; and FIG. 9 is an enlarged fragmentary section taken along the line 9—9 in FIG. 2 and showing the attachment of the tampering indicator arrangement on the valve re-opening actuator.

Referring first to FIGS. 2 and 4 in particular, the present valve assembly includes a conventional annular valve body or housing 11 of known design having integral, screw-threaded inlet and outlet fittings 12 and 13 on its opposite sides. The valve body has an inlet passage 14 (FIG. 4), an outlet passage 15 and a frusto-conical chamber or cavity 16 between them.

A tapered plug valve member 17 is rotatably received in the valve body cavity 16 in sealing engagement with the latter's frusto-conical side wall. The plug valve member presents a cross bore 18 (FIG. 4), which in one rotational position of the plug valve member provides full fluid communication between the inlet and the outlet passages 14 and 15 in the valve body. This "open" position of the plug valve member 17 is indicated in full lines in FIG. 1. The plug valve member 17 may be turned 90° counterclockwise in FIG. 1 to the "closed" position, shown in phantom, in which it completely blocks the inlet passage 14 from the outlet passage 15.

In normal use, the plug valve member 17 may be turned from its open position to its closed position by turning a valve-closing actuator 19. This actuator is cylindrical at its lower end and has a snug, but rotatable, fit thereat in a complementary recess 20 formed in the upper end of the plug valve member 17, as best seen in FIGS. 4 and 8. At its upper end, the actuator 19 presents opposite flat sides, which enable it to be conveniently gripped and turned by a conventional wrench or pliers.

The actuator has a radially outwardly-protruding projection 22, which is engageable alternatively with a pair of upwardly-projecting stop members 23 and 24 (FIGS. 1 and 2) on the upper end of the valve body 11. As best seen in FIG. 1, these stop members are spaced apart 90° circumferentially and they provide opposite limit stops which permit the actuator 19 to be turned only one-quarter turn between the full-line position and the phantom-line position in FIG. 1.

Near its lower end the actuator 19 has a pair of diametrically extending cross bores 25 and 26 (FIG. 5) which intersect each other perpendicularly. A first arcuate slot 27 extends between the intersecting cross bores 25, 26 at the left side in FIG. 5, and a similar arcuate slot 28 extends between the intersecting cross bores at the right side in FIG. 5. Each of these arcuate slots is open from the intersection of the cross bores 25, 26 (at the center of the actuator 19) radially outward to the cylindrical periphery of the actuator. Between the slots 27 and 28 the actuator presents sector-shaped solid segments 29 and 30.

The plug valve member 17 carries a cross pin 31 which extends diametrically through the cross-bored and slotted section of the actuator 19, so that the actuator 19 is coupled to the plug valve member in the manner now to be explained. The cross pin 31 has a snug, but sliding, fit in the slots 27, 28, so that the actuator 19 can be turned with respect to the plug valve member, as explained hereinafter.

FIG. 5 shows the positions of the parts when the valve is open. At this time the actuator 19 is at its extreme clockwise position in FIG. 1, with its projection 22 abutting against the stop member 23 on valve body 11. At this time the cross bore 25 in the actuator 19 snugly receives the cross pin 31 on the plug valve member 17 (FIG. 5) and the passage 18 in the plug valve member is in full registration with the inlet and outlet passages 14 and 15 in the valve body 11, as shown in FIG. 4.

To close the valve, the actuator 19 is turned 90° counterclockwise in FIG. 1 from the full line position to the phantom line position, where its projection 22 abuts against the stop member 24 on the valve body 11. This brings the parts to the position shown in FIG. 6 because the actuator segments 29 and 30 have engaged the cross pin 31 to cause the plug valve member 17 to turn in unison with the actuator 19. This quarter-turn of the plug valve member 17 from its open position causes it now to block the fluid communication between the valve body inlet and outlet ports 14 and 15.

The now-closed valve cannot be re-opened merely by turning the actuator 19 back to its former position because of the lost-motion connection now provided between the actuator and the plug valve member. As shown in FIG. 7, if the actuator is turned 90° clockwise from its FIG. 6 position, such rotational movement is not imparted to the plug valve member 17, which remains in its closed position. The arcuate slots 27 and 28 in actuator 19 permit the actuator to be turned while the plug valve member remains stationary. The return rotation of the actuator 19 is limited by the engagement of its projection 22 with the stop member 23 on the valve body 11, as shown in full lines in FIG. 1.

Consequently, the actuator 19 can be turned clockwise only to the position shown in FIG. 7, where its segments 29 and 30 just begin to re-engage the cross pin 31 on the plug valve member 17.

With this arrangement, the actuator 19 can be used to close the valve but cannot be used to re-open it once it has been closed. This is of particular advantage where the valve is in a gas line in a residence, for example, where the customer should be free to turn off the gas, such as in case of a flood, but should not be free to turn it back on again because of the danger of an explosion.

The present valve assembly also has a valve re-opening actuator which requires a special tool to operate and which has provision for indicating any tampering. Referring to FIGS. 2 and 4, this valve re-opening actuator is a frusto-conical plate 32 of short axial extent which is attached by a bolt 33 to the lower end of the plug valve member 17. Plate 32 sealingly, but slidingly, engages the lower end of the valve body 11. The plug valve member 17 has a non-circular projection 34 on its lower end, which preferably is D-shaped as shown in FIGS. 3 and 8, and which is received snugly in a complementary recess in the top of plate 32. The plate 32 turns in unison with the plug valve member 17, and vice versa.

The frusto-conical shape and the short axial extent of the plate 32 make it difficult to grip and turn with a conventional wrench.

The plate 32 is formed with a pair of circumferentially-spaced openings 35 and 36 in its frusto-conical periphery. These openings are normally closed by respective bolts 37 and 38, which are screw-threaded into the plate 32. When these bolts are removed a specially-designed spanner wrench may be applied to the plate 32, with projections on the wrench fitting into the openings 35 and 36, and the plate may be turned 90° to turn the plug valve member 17 from its closed position to its open position.

A seal arrangement is provided for indicating the removal of the bolts 37, 38, by an unauthorized person. This seal comprises a wire 40 which extends through a drilled passage 41 in the head of each bolt (FIG. 9) and through a registering passage 42 in the plate 32 adjacent to the bolt head. The opposite ends of this wire are overlapped about midway between the openings 35 and 36, as best seen in FIGS. 2 and 3, and sealed to each other by a lead disc 41' or the like. Removal of either bolt 37 or 38 will cause the disc 41' to be broken, thereby indicating that the valve has been tampered with.

This arrangement makes it difficult for anyone not having a specially designed wrench to re-open the valve once it has been closed. Furthermore, in case such unauthorized re-opening of the valve does occur, the breakage of the plug 41 will provide an external indication of such tampering the next time a routine visual inspection of the valve is made by the gas company.

It will be seen that by a 90° reorientation of the cross bore 18 with respect to the inlet and outlet passages the valve may be in closed condition when the plug and actuator are in the positions indicated in FIGS. 4 and 5, and that it would then be in open position with the parts in the positions shown in FIG. 6. With this orientation, the valve would be readily operable from closed to open position by movement of the actuator 19 but return movement of the actuator 19 would be ineffective to reset the valve into closed position.

From the foregoing description it will be apparent that the illustrated embodiment of the present invention constitutes a relatively simple and reliable valve assembly which is readily adapted to be moved from one position to a second position but not to be returned from such second position to such one position except by authorized personnel. While a presently-preferred embodiment has been illustrated and described in detail, it is to be understood that the invention is susceptible of other physical embodiments differing from the particular arrangement disclosed.

I claim:

1. A valve assembly comprising: a valve body having inlet and outlet passages; a plug valve member having a passage therein for connecting said inlet and outlet passages in the valve body, said plug valve member being disposed within and being rotatable in said valve body between an open position in which its passage connects said inlet and outlet passages in the valve body and a closed position in which it blocks said inlet passage from said outlet passage, a cross pin carried by said plug valve member and caged therein by said valve body; a valve-closing actuator at one end of the valve body and rotatable in opposite directions; said actuator having a portion extending into and rotatable in said plug member, stop means acting between said actuator and the valve body for limiting the rotation of the actuator in either direction between first and second spaced limit stops; said portion of said actuator having at least one circumferentially elongated slot therein slidably receiving said cross pin and being thereby attached to said plug valve member, said actuator at said first limit stop thereof engaging the cross pin on said plug valve member in the latter's open position and, upon rotation toward said second limit stop, turning said plug valve member to its closed position, said actuator, when turned from said second limit stop back toward said first limit stop, sliding its circumferentially elongated slot over said cross pin without turning said plug valve member whereby the latter remains in its closed position.

2. In a valve assembly comprising an annular valve body having an internal cavity bounded by a circular wall, a valve plug rotatably disposed within said valve body cavity and having a circular outer wall engaged with said circular wall of said body, said plug having a circular cavity therein opening outwardly thereof and coaxial with said plug, an actuator member having a portion rotatively disposed within said plug cavity, a circumferentially elongated slot extending through said portion, a pin extending through said slot and through said plug and being caged in position by said wall of said valve body, said pin retaining said portion of said actuator member in said plug cavity, stop means between said body and said actuator member for limiting rotation of the actuator member with respect to the body, said pin being engageable with said plug in one direction of movement of said actuator member as limited by said stop means and having lost motion within said slot upon reverse rotation thereof.

3. A valve assembly comprising: a valve body having inlet and outlet passages; a plug valve member having a passage therein for connecting said inlet and outlet passages in the valve body, said plug valve member being disposed within and being rotatable in said valve body between an open position in which its passage connects said inlet and outlet passages in the valve body and a closed position in which it blocks said inlet passage from said outlet passage, an actuator member, one of said members having a cavity therein and the other member comprising a portion rotatably disposed in said cavity, said cavity and portion being located within said valve body, said other member having a circumferentially elongated slot therein, a pin passing through said one member and through said slot and being caged in position by said valve body, stop means acting between said actuator and said valve body for limiting the rotation of the actuator in either direction between first and second spaced limit stops; said pin being in driving engagement with a side of said slot when said actuator is at said first limit of said stop means for rotating said plug member upon rotation thereof to said second limit and having lost motion in said slot upon return rotation of said actuator from said second to said first limit.

* * * * *